United States Patent
Roy et al.

(10) Patent No.: US 10,984,824 B2
(45) Date of Patent: Apr. 20, 2021

(54) METHOD OF FORMING TAPERED JUNCTION SHIELD FOR SELF-COMPENSATION OF ASYMMETRY WITH INCREASING ASPECT RATIO FOR TUNNELING MAGNETO-RESISTANCE (TMR) TYPE READ HEAD

(71) Applicant: Headway Technologies, Inc., Milpitas, CA (US)

(72) Inventors: Urmimala Roy, Milpitas, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/916,410

(22) Filed: Jun. 30, 2020

(65) Prior Publication Data

US 2020/0357431 A1  Nov. 12, 2020

Related U.S. Application Data

(62) Division of application No. 16/430,574, filed on Jun. 4, 2019, now Pat. No. 10,706,878, which is a division
(Continued)

(51) Int. Cl.
*G11B 5/39* (2006.01)
*G11B 5/31* (2006.01)

(52) U.S. Cl.
CPC .......... *G11B 5/3912* (2013.01); *G11B 5/3169* (2013.01); *G11B 5/398* (2013.01);
(Continued)

(58) Field of Classification Search
None
See application file for complete search history.

(56) References Cited

U.S. PATENT DOCUMENTS

| 6,542,341 B1 | 4/2003 | Carey et al. |
|---|---|---|
| 7,016,166 B1 | 3/2006 | Hou et al. |

(Continued)

OTHER PUBLICATIONS

"An Areal-Density Capability Study of SMR by Using Improved Write and Read Heads," by T. K. Kagami et al., Intermag 2011, IEICE Technical Committee Submission System, Conference Paper's Information, Nov. 18, 2011, 3 pages.

(Continued)

*Primary Examiner* — Craig A. Renner
(74) *Attorney, Agent, or Firm* — Saile Ackerman LLC; Stephen B. Ackerman (57) ABSTRACT

A junction shield (JS) structure and method of forming the same are disclosed for providing longitudinal bias to a free layer (FL) having a width (FLW) and magnetization in a cross-track direction between sidewalls in a sensor. The sensor is formed between bottom and top shields and has sidewalls extending from a front side at an air bearing surface (ABS) to a backside at a stripe height (SH) from the ABS. The JS structure has a lower layer (JS1) with magnetization parallel to that of the FL, and a tapered top surface such that JS1 has decreasing thickness with increasing height from the ABS. As aspect ratio or AR (SH/FLW) increases above 1, longitudinal bias increases proportionally to slow an increase in asymmetry as AR increases, and without decreasing amplitude for a reader with low AR. The JS1 layer may be antiferromagnetically coupled to an upper JS layer for stabilization.

9 Claims, 8 Drawing Sheets

Related U.S. Application Data of application No. 15/686,497, filed on Aug. 25, 2017, now Pat. No. 10,319,398.

(52) U.S. Cl.
CPC .......... *G11B 5/3909* (2013.01); *G11B 5/3932* (2013.01); *G11B 2005/3996* (2013.01); *Y10T 29/49048* (2015.01)

(56) References Cited

U.S. PATENT DOCUMENTS

| | | | |
|---|---|---|---|
| 8,179,642 B2 | 5/2012 | Kawamori et al. | |
| 9,230,577 B2 | 1/2016 | Zhang et al. | |
| 2005/0122632 A1 | 6/2005 | Garfunkel | |
| 2005/0146813 A1* | 7/2005 | Oshima | G11B 5/3903 360/324.12 |
| 2007/0081277 A1 | 4/2007 | Folks et al. | |
| 2009/0034129 A1* | 2/2009 | Yanagisawa et al. | G11B 5/3932 360/313 |
| 2009/0279213 A1 | 11/2009 | Wu et al. | |
| 2010/0142100 A1* | 6/2010 | Yoshida et al. | G11B 5/3932 360/313 |
| 2010/0302688 A1* | 12/2010 | Shiinnoto et al. | G11B 5/3932 360/319 |
| 2011/0051291 A1 | 3/2011 | Miyauchi et al. | |
| 2011/0069417 A1 | 3/2011 | Kawamori et al. | |
| 2011/0090595 A1 | 4/2011 | Hirata et al. | |
| 2011/0134564 A1* | 6/2011 | Yoshida et al. | G11B 5/3912 360/234 |
| 2014/0218825 A1* | 8/2014 | Sapozhnikov et al. | G11B 5/3912 360/235.4 |
| 2017/0125046 A1* | 5/2017 | Stokes et al. | G11B 5/3932 |

OTHER PUBLICATIONS

U.S. Office Action, U.S. Appl. No. 15/686,497, Applicants: Roy et al, dated Sep. 4, 2018, 17 pages.

* cited by examiner

METHOD OF FORMING TAPERED JUNCTION SHIELD FOR SELF-COMPENSATION OF ASYMMETRY WITH INCREASING ASPECT RATIO FOR TUNNELING MAGNETO-RESISTANCE (TMR) TYPE READ HEAD

This is a divisional application of U.S. patent application Ser. No. 16/430,574; filed on Jun. 4, 2019, which is a divisional of U.S. patent application Ser. No. 15/686,497 filed on Aug. 25, 2017, now issued as U.S. Pat. No. 10,319,398, which are herein incorporated by reference in their entirety, and assigned to a common assignee.

RELATED PATENT APPLICATION

This application is related to U.S. Pat. No. 9,230,577; which is assigned to a common assignee, and herein incorporated by reference in its entirety.

TECHNICAL FIELD

The present disclosure relates to a method of forming a longitudinal biasing scheme for a sensor structure in a TMR reader wherein a junction shield (JS) formed on either side of a free layer has decreasing down-track thickness with increasing distance (height) from the air bearing surface (ABS) thereby compensating for greater sensor asymmetry as the aspect ratio (stripe height to free layer width or FLW) becomes larger in advanced devices, especially where FLW is less than 35 nm.

BACKGROUND

In hard disk drive applications, there is a constant drive to increase the recording areal density to reduce the cost of information storage. The increase in recording areal density is accomplished by decreasing the size of the writer and reader sensors that are used to record and reproduce signals. In today's products, the reader sensor is typically made using a TMR sensor structure, which includes two ferromagnetic layers that are separated by a dielectric layer called a tunnel barrier. One of the ferromagnetic layers is referred to as a reference layer (RL) wherein the magnetization direction is fixed by exchange coupling with an adjacent antiferromagnetic (AFM) pinning layer. The second ferromagnetic layer is a free layer (FL) wherein the magnetization vector can rotate in response to external magnetic fields to be either parallel or anti-parallel to the magnetic moment in the RL depending on the magnetic field direction from the recording media. Digital data sequence made of "0" or "1" is translated into different magnetization directions on the recording media which is recorded by a write sensor in each recording head. As the FL rotates, the resistance measured by passing a current from the FL to the RL will change. The change in resistance is measured and used to decode the magnetization pattern from the recording media and reproduce the information that was recorded earlier.

Figure 1A:
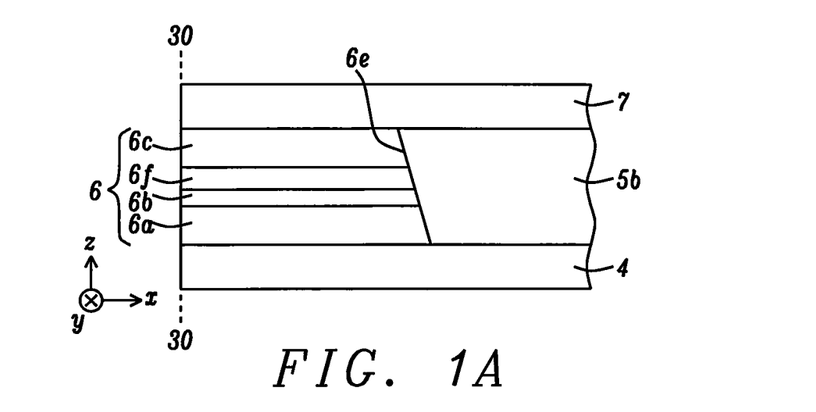
FIG. 1A is a down-track cross-sectional view of a sensor structure in a TMR reader according to one embodiment of the present disclosure.

In FIG. 1A, one example of a TMR reader is shown having a sensor structure 6 formed between a lower shield 4 and an upper shield 7. The down-track cross-sectional view depicts a front side of the sensor structure at an ABS 30-30, and a backside 6e adjoining a dielectric (gap) layer 5b. In a so-called bottom spin valve configuration for the sensor structure, bottom portion 6a comprises a RL, and may also include one or multiple seed layers and an AFM layer on the seed layer (not shown). Tunnel barrier 6b is between the RL and a FL 6f. Upper portion 6c is a capping layer. In some designs, a part of the RL may be recessed from the ABS.

Figure 1B:
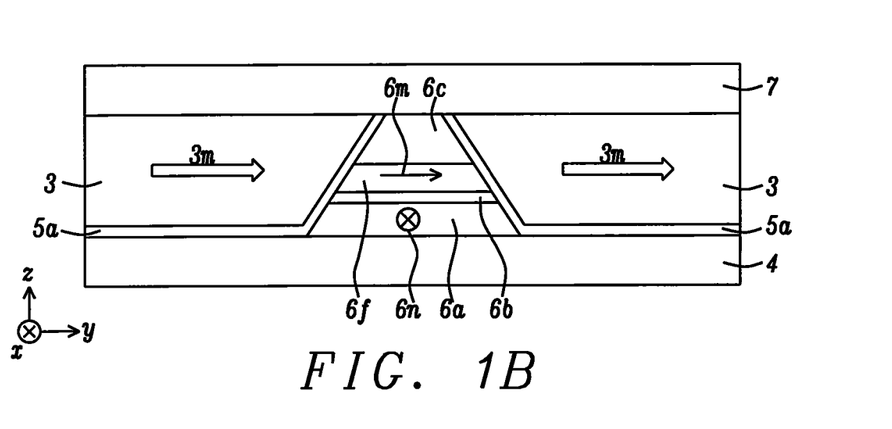
FIG. 1B is an ABS view of the sensor structure in FIG. 1a that includes a JS on each side of the sensor in order to stabilize the FL magnetization in a longitudinal (cross-track) direction.

Referring to FIG. 1B, an ABS view of the TMR reader in FIG. 1A is illustrated and shows magnetization 3m in adjacent JSs 3 provide a longitudinal biasing effect to stabilize FL magnetization 6m in the absence of an external magnetic field. One or both of permanent magnetic material and soft magnetic material each having a magnetization aligned near the FL are generally used to bias the FL magnetization moment with respect to the RL so as to obtain a substantially orthogonal relative orientation between FL magnetization 6m and RL magnetization 6n in a zero applied field environment.

Figure 1C:
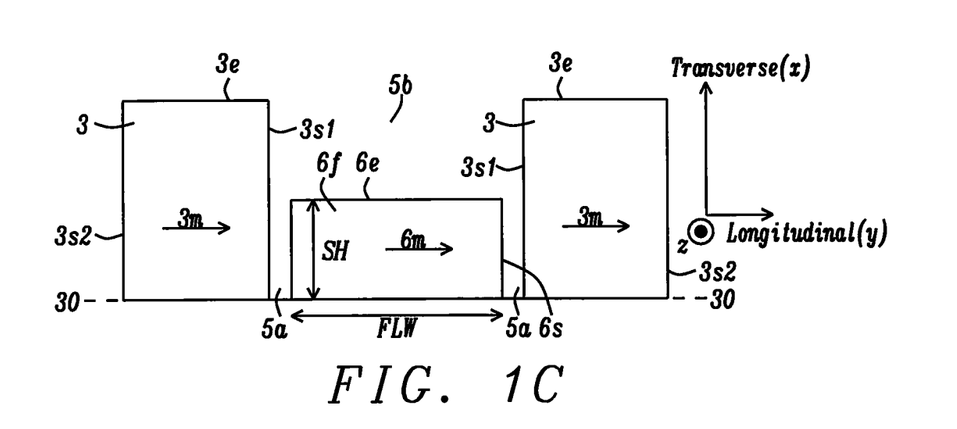
FIG. 1C is a top-down view of the JSs and FL in FIG. 1B depicting the FLW and SH that determine AR.

FIG. 1C depicts a top-down view of the sensor structure in FIG. 1B where layers above the FL are removed. A JS 3 is formed adjacent to each side of FL 6f at the ABS 30-30. The longitudinal biasing scheme provides a JS magnetization 3m that is parallel to the ABS and to the FL magnetic moment 6m so that a single domain magnetization state in the FL will be stable against all reasonable perturbations when no external magnetic field is applied. An inner JS side 3s1 is usually separated from the FL by a dielectric layer 5a. Each JS also has a front side at the ABS, a backside 3e, and an outer side 3s2 facing away from the FL. Note that the cross-track direction along the y-axis is known as the longitudinal direction, and a direction orthogonal to the ABS (along the x-axis) is referred to as the transverse direction.

Asymmetry of the quasi-static test (QST) response of a TMR read head is defined as the relative difference in the reader resistance for positive and negative magnetic fields (of equal magnitude) in the transverse direction. QST asymmetry, which is hereinafter referred to as asymmetry, is strongly dependent on the aspect ratio (AR) of the reader, which is defined as the ratio of stripe height (SH) to FL width (FLW) expressed as SH/FLW where SH is the distance between a front side of the FL 6f at ABS 30-30 and the FL backside 6e. Asymmetry increases as AR increases thereby making the reader performance sensitive to process induced AR variations, and establishing an upper limit to allowable AR set by acceptable asymmetry.

Asymmetry of reader response depends, among other factors, on the relative magnetization directions of the FL and the RL in the absence of an applied magnetic field (zero field). Thus, FL magnetization direction in a zero field environment is affected by the strength of the longitudinal bias, given by the magnitude of 3m, and the FL AR. The zero field relative magnetization directions of the FL and RL are quantified using the so-called "bias point", which is quantified by the resistance of the sensor structure stack at zero field relative to that at a very large external applied field when the FL and RL magnetizations are driven parallel to each other. Because asymmetry becomes considerably large for long SH dimensions that lead to an AR of 1 or higher, and contributes to degraded TMR reader performance, especially when FLW is proximate to 30 nm or less, a method to improve the aforementioned sensitivity to increasing AR or SH is needed.

SUMMARY

One objective of the present disclosure is to provide a JS configuration to stabilize a FL magnetization in a sensor structure of a TMR reader that compensates for higher asymmetry as AR increases above 1, especially for FLW proximate to 30 nm or less, without introducing a significant loss in amplitude for low AR or SH readers.

A second objective of the present disclosure is to provide a method of forming the JS configuration that satisfies the first objective.

According to one embodiment of the present disclosure, these objectives are realized with JS structure configured to have at least a first JS layer having decreasing thickness with increasing height from the ABS. In some embodiments, two JS layers are coupled through antiferromagnetic coupling (AFC) on each side of a TMR sensor at an ABS. Thus, a first (lower) JS layer has a first magnetization (m1) aligned parallel to the ABS and to a magnetization (m2) in the adjacent free layer, and provides the primary means of longitudinally biasing (stabilizing) so that m2 is aligned orthogonal to the RL magnetization in the absence of an externally applied magnetic field. There is a first AFC layer with a substantially uniform thickness on the lower JS layer, and a second JS layer on the first AFC layer where the second JS layer has a magnetization m3 aligned opposite to that of m1.

In a first embodiment, the lower JS layer has a tapered top surface such that a first thickness (t1) of the lower JS layer at the ABS is greater than a second thickness (t2) at a backside thereof at a first height from the ABS. The second JS layer also extends to a backside at the first height from the ABS, and has a constant thickness between a front side at the ABS and the backside. In other words, the second JS layer top surface is also tapered and formed essentially parallel to the lower JS layer top surface. As the taper angle $\alpha$ between the lower JS layer top surface and a plane formed orthogonal to the ABS increases for a given t2 and SH, the average thickness of the lower JS layer (t1+t2)/2 increases (since $t1 \cong t2 + SH \times \tan \alpha$, assuming JS height is approximately equal to the SH of the FL), so the effective longitudinal bias on the FL for a given SH of the FL increases. Also, for a higher value of $\alpha$, for a given t2, t1 increases at a faster rate with the SH of the FL (since $t1 \cong t2 + SH \times \tan \alpha$), hence the rate of increase of effective longitudinal bias with AR or SH also becomes higher.

In a second embodiment, the second JS layer in the first embodiment is modified to have increasing thickness with increasing height from the ABS such that a backside thereof has a third thickness (t3) and a front side at the ABS has a fourth thickness (t4) where t4<t3. Preferably, t1+t4=t2+t3 such that a top surface of the second JS layer is parallel to the lower JS layer bottom surface.

According to a third embodiment, the JS structure of the first embodiment is modified to include a second AFC layer having a uniform thickness on the second JS layer, and a third JS layer with a uniform thickness on the second AFC layer. Therefore, both of the second and third JS layers have tapered top surfaces that are essentially parallel to the top surface of the lower JS layer. Moreover, the third JS layer has a magnetization m4 that is aligned parallel to m1 and m2, and opposite to m3.

In a fourth embodiment, the JS structure of the second embodiment is modified to include a second AFC layer having a uniform thickness on the second JS layer, and a third JS layer with a uniform thickness (t5) on the second AFC layer. As a result, a combined thickness (t1+t4+t5) of the JS layers at the ABS is essentially equal to a combined thickness (t2+t3+t5) of the JS layers at a backside of the JS structure such that a top surface of the third JS layer is parallel to the lower JS layer bottom surface.

Besides a FL, the sensor structure has a bottom portion comprised of a bottommost seed layer, an AFM layer, and a synthetic antiparallel (SyAP) RL in some embodiments. There is a tunnel barrier between the RL and the FL, and a capping layer on the FL. The sensor structure has a bottom surface formed on a bottom shield, a top surface that adjoins a top shield, and sidewalls connecting the top and bottom surfaces. A non-magnetic insulation layer adjoins the sidewall of the sensor structure and extends along a top surface of the bottom shield to separate the JSs from the bottom shield and sensor structure.

In the JS structure, each of the magnetic layers may be made of a soft magnetic material such as Ni-rich NiFe, or Co-rich CoFe with a magnetization that is set during an annealing step with in situ magnetic field, or may be comprised of a hard magnetic material including one of CoPt, CoCrPt, or FePt. Each of the antiferromagnetically coupled layers may be separated using Ru, for example, with a thickness that induces AFC between the JS layers.

In all embodiments, the tapered lower JS layer compensates for a shift in bias point of the TMR reader as AR increases. The rate of compensation of asymmetry with increasing AR or SH depends on the taper angle of the lower JS layer top surface for a given t2, and increases as taper angle becomes larger. As a result, the reader design can accommodate AR values above 1 without introducing unacceptably large asymmetry for large AR, or unacceptably low amplitude for low AR.

The present disclosure also includes a method of forming a TMR sensor with adjacent junction shields wherein at least the lower JS layer has a tapered top surface. Once a sensor stack of layers with sidewalls and backside is formed on the bottom shield, an insulation layer and first JS layer are sequentially formed at each sidewall such that the first JS layer has a top surface orthogonal to the eventual ABS plane. A taper is then formed on the lower JS layer with an angled ion beam etch before the remainder of the JS structure is deposited.

DETAILED DESCRIPTION

The present disclosure is a JS design in a read head, and a method for making the same, for longitudinal biasing of an adjacent FL in a TMR sensor wherein at least a first JS layer has a tapered top surface to compensate for higher asymmetry as the AR increases above 1, especially as FLW shrinks to around 30 nm or less. Thus, an effectively thinner JS for low AR ensures high amplitude if the reader has a low AR, while an effectively thicker JS for high AR above 1 ensures that the asymmetry is not unacceptably high. The JS design is flexible to include multiple magnetic layers that are antiferromagnetically coupled. In the drawings, the x-axis (transverse) direction indicates a height dimension with respect to the ABS, the y-axis is a cross-track (width) direction, and the z-axis is a down-track (thickness) direction.

Figure 2:
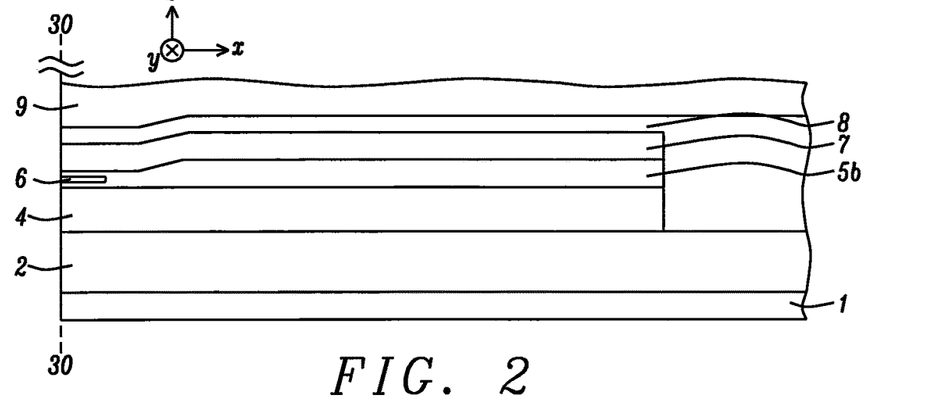
FIG. 2 is a down-track cross-sectional view of a TMR reader having a sensor structure formed at an ABS.

Referring to FIG. 2, one embodiment of a read head having a TMR sensor and JS structure of the present disclosure is depicted in a down-track cross-sectional view from a plane orthogonal to an air bearing surface (ABS) 30-30. It should be understood that the read head may be part of a combined read head-write head design wherein the write head portion (not shown) is formed on the read head. The read head is formed on a substrate 1 that may be comprised of AlTiC (alumina+TiC). Substrate 1 is typically part of a slider (not shown) formed in an array of sliders on a wafer. After the read head (or combined read head-write head) is fabricated, the wafer is sliced to form rows of sliders. Each row is typically lapped to afford an ABS before dicing to fabricate individual sliders that are used in a magnetic recording device.

The read head typically has a bottommost insulation layer 2 that is formed on substrate 1 and is made of a dielectric material such as alumina. A bottom shield 4 also referred to as the S1 shield is formed on insulation layer 2 and may be comprised of NiFe, CoFe, or CoFeNi. In some embodiments, the top shield is a so-called S2A shield. A magnetoresistive element also known as TMR sensor 6 is formed between the top and bottom shields and usually has a front side exposed at the ABS 30-30. There is a second insulation layer 5b between the bottom shield and a top shield 7, and behind the TMR sensor. The read gap is defined as the distance between the top shield and bottom shield measured at the ABS.

Above the top shield 7, an insulation layer 8 and a shield (S2B) layer 9 are sequentially formed. Shield layers 7, 9 may be made of the same magnetic material or a different material as in the S1 shield 4, and insulation layer 8 may be the same dielectric material or a different material as in insulation layer 2. The present disclosure anticipates that various configurations of a write head may be employed with the read head structure disclosed herein. Accordingly, write head layers are not illustrated in order to focus on the key features of the junction shields and TMR sensor embodiments disclosed with respect to FIGS. 3-12.

Figure 3:
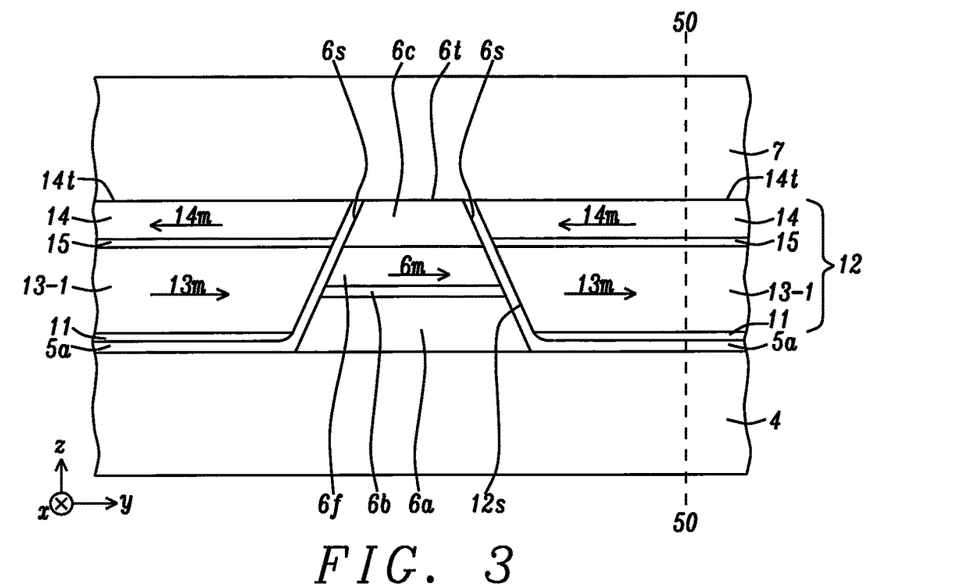
FIG. 3 is an ABS view of a sensor structure wherein FL magnetization is stabilized by two JSs that are antiferromagnetically coupled on each side of the FL according to an embodiment of the present disclosure.

Referring to FIG. 3, an enlarged section of the read head in FIG. 2 is depicted from an ABS perspective. The sensor structure 6 comprises a bottom portion 6a, tunnel barrier 6b, FL 6f, and a capping layer 6c that are sequentially formed on a top surface of bottom shield 4. Insulation layer 5a contacts sensor sidewalls 6s, and contacts the top surface of bottom shield 4 that is not covered by the sensor structure. An optional seed layer 11 is formed on a top portion of insulation layer 5a above bottom shield 4. The exemplary embodiment depicts a bottom spin valve configuration wherein layer 6a comprises a RL that is formed below the tunnel barrier in the sensor structure.

In FIG. 3, a first embodiment of the JS structure 12 of the present disclosure is shown and comprises a lower JS layer 13-1, first AFC layer 15, and a second JS layer 14 sequentially formed on the optional seed layer 11 on each side of the sensor structure. The seed layer may be selected from NiCr, NiFeCr, NiFe, Cu, or Ni, or bilayer or multilayer stacks comprising Ta, Ru, and one or more of the aforementioned seed layer materials. Sidewall 12s of the JS structure adjoins insulation layer 5a. Each lower JS layer has magnetization 13m aligned parallel to FL magnetization 6m thereby providing the primary means of longitudinal biasing (stabilization) to FL 6f in the absence of an externally applied magnetic field. Each second JS layer has magnetization 14m aligned opposite to 13m as a result of AFC layer 15. AFC between layers 13-1, 14 has a net effect of stabilizing the JS compared with a single JS layer described later with regard to FIGS. 11-12. The junction shields prevent stray magnetic fields produced by a magnetic medium (not shown) from inadvertently switching the magnetization direction of the FL.

Although bottom portion 6a is depicted with a larger cross-track width than that of capping layer 6c, sidewalls 6s in other embodiments may be substantially vertical. Both shields 4 and 7 may be comprised of one or more of NiFe, CoFe, or CoFeNi, or other magnetic alloys thereof containing additional elements. JS layers 13-1, 14 are made of a soft magnetic material such as one or more of CoFe, NiFe, and CoFeNi, or other magnetic alloys thereof containing additional elements. In alternative embodiments, one or both JS layers are comprised of a hard magnetic material including one or more of CoPt, CoCrPt, FePt, and the like. AFC layer 15 is preferably Ru with an appropriate thickness.

Figure 4:
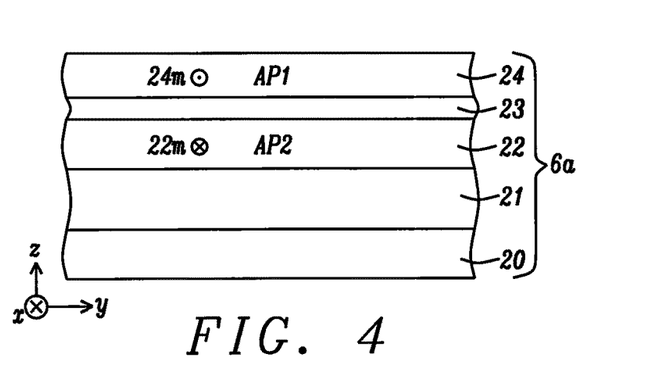
FIG. 4 is an enlargement of the bottom portion of the sensor structure in FIG. 3 that shows a synthetic antiparallel (SyAP) configuration for the RL.

According to one embodiment shown in FIG. 4, bottom portion 6a in the TMR sensor structure may comprise a bottommost seed layer 20, AFM layer 21, and a SyAP RL with an AP2/AFC layer/AP1 configuration. AP1 layer 24 contacts a bottom surface of tunnel barrier 6b and has a magnetization 24m out of the plane of the drawing. AP2 layer 22 is antiferromagnetically coupled to the AP1 layer 24 through AFC layer 23 and has magnetization 22m aligned anti-parallel to 24m. Furthermore, magnetization 22m is pinned in a fixed direction by AFM layer 21. Note that AP1 magnetization 24m is aligned orthogonal to FL magnetization 6m in the absence of an externally applied field (zero field environment). Each of the magnetic layers 6f, 22, 24 may be comprised of one or more of Co, Fe, and Ni, including alloys with B, Ta, Cr, or W. AFM layer 21 is generally comprised of PtMn, IrMn, or another suitable AFM material.

In related U.S. Pat. No. 9,230,577, we disclosed a JS structure similar to that shown in FIG. 3 where multiple JS layers are antiferromagnetically coupled in order to improve JS stability. However, the earlier JS structure did not consider the effect of an AR higher than 1 that causes unacceptably high asymmetry in the read head design, especially as advanced designs are based on increasingly smaller FLW values proximate to 30 nm, or less. Now, we have discovered a JS structure capable of compensating for higher asymmetry in advanced products with small FLW, without reducing the amplitude to an extent that is unacceptable for low AR designs. The improved structure is primarily evident in down-track cross-sectional views along a plane that is aligned orthogonal to the ABS.

Figure 5:
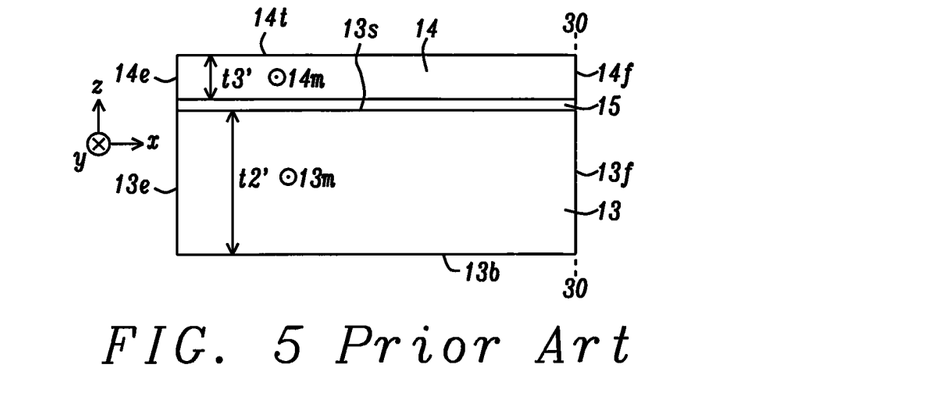
FIG. 5 is a down-track cross-sectional view of a pair of JSs in the prior art having a constant thickness with increasing height from the ABS.

FIG. 5 illustrates a JS structure having two magnetic layers 13, 14 that are antiferromagnetically coupled through an intermediate AFC layer as found in one of our process of record (POR) schemes. Both JS layers 13, 14 have a constant thickness t2', t3', respectively, between front sides 13f, 14f at the ABS 30-30, and backsides 13e, 14e, respectively. Lower JS layer 13 has top surface 13s aligned orthogonal to the ABS. When the AR becomes greater than 1 (SH>FLW in FIG. 1c), shape anisotropy of the FL increases in the transverse direction and leads to an effective decrease in longitudinal bias (LB). As a consequence, there is a shift in the zero-field magnetization direction of the FL and a shift in the bias point as the FL magnetization rotates closer to the RL magnetization direction thereby making the zero-field angle between the FL and RL to be less than 90°. Departure from an orthogonal alignment of FL and RL magnetization directions in a zero field environment causes non-linear response of the reader to applied magnetic fields, and an increase in asymmetry for increasing AR values.

Figure 6:
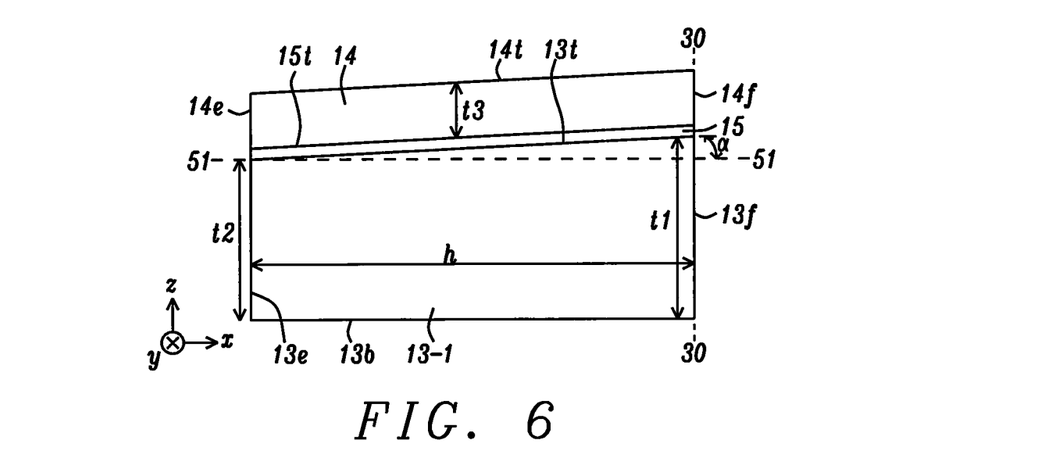
FIG. 6 is a down-track cross-sectional view of a pair of antiferromagnetically coupled JSs wherein a lower JS is tapered to have decreasing thickness with increasing height from the ABS while the upper JS has a constant thickness according to a first embodiment of the present disclosure.

With regard to FIG. 6 that is a cross-sectional view taken along plane 50-50 in FIG. 3, we have discovered that by incorporating a non-uniform thickness in the transverse direction for the lower JS layer, there is an effective increase in LB on the FL with increasing AR. In other words, the effective LB increase in embodiments of the present disclosure compensates, at least partially, for the effective decrease in LB in sensor designs when AR reaches 1 or higher, without degrading the amplitude for low AR readers (AR<1) with thicker than necessary JS. The lower JS layer 13-1 is designed to have sloped top surface 13t such that thickness t1 at a front side 13f at the ABS 30-30 is greater than thickness t2 at the backside 13e. Thickness t2 may be different from t2' in the POR scheme in FIG. 5. Thus, the effective or average thickness (t1+t2)/2 in the FIG. 6 scheme may be smaller or greater than t2' for a conventional reader in FIG. 5, depending on how t1 and t2 compare with respect to t2'. As explained later, t2 is preferably substantially larger than thickness t3 of the second JS layer 14 to ensure a higher magnetization 13m in lower JS layer 13-1 than magnetization 14m in second JS layer 14. AFC layer 15 and JS layers 13-1, 14 extend to the same height h from the ABS.

Top surface 13t of lower JS layer 13-1 is formed at a taper angle α that is greater than 0° with respect to plane 51-51 which is orthogonal to the ABS 30-30, and parallel to bottom surface 13b. A maximum value for angle α is related to the practical aspects of an angled ion beam etch (IBE) that forms the taper angle. For example, depending on the desired values of t1 and h, the taper angle may be restricted to a value substantially less than 45° in order to maintain t2>0. Preferably, AFC layer 15 with top surface 15t is deposited in a conformal manner on the lower JS layer and has a uniform thickness. Moreover, second JS layer 14 has a constant thickness t3 between a front side 14f and backside 14e thereof. Accordingly, top surface 14t is also tapered and is essentially parallel to tapered top surface 13t.

Compensation of shape anisotropy by incorporating an effectively increasing LB with increasing AR for the tapered JS design of the present disclosure leads to a slower rate of bias point shifting with increasing AR, and hence a slower rate of increase in asymmetry with AR. The rate of increase in longitudinal bias with increasing AR or SH is determined by the taper angle α. In particular, the rate of increase of LB with AR increases as the taper angle α becomes larger, for a given t2. Note that the slope of the reader transfer curve shown later in FIG. 13, which decides the so-called amplitude of reader response, may be tuned by the average thickness of the tapered lower JS layer 13-1, namely, (t1+t2)/2, for a given amount of taper (α) and a given thickness t3 of the upper JS layer 14. Thus, for a certain taper angle α and SH of the FL, the effective LB becomes larger as the average thickness (t1+t2)/2 of the tapered lower JS layer increases.

Figure 7:
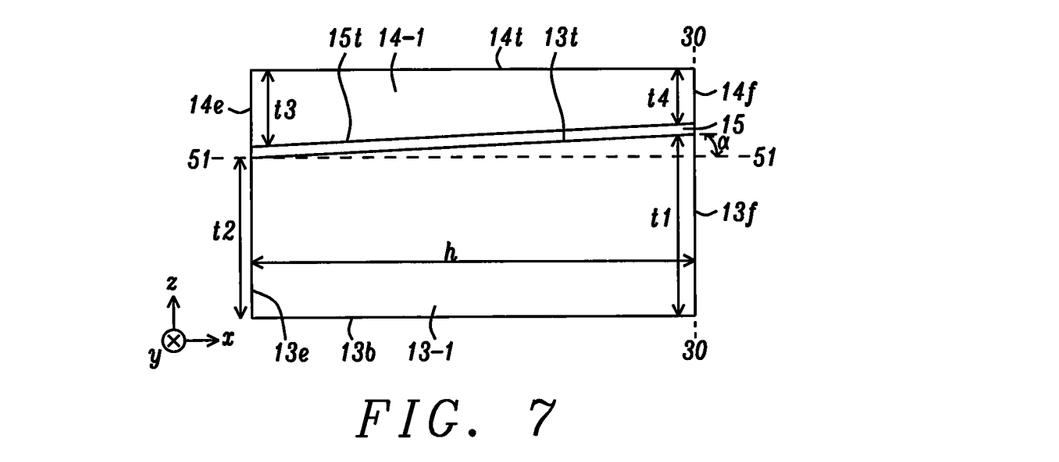
FIG. 7 is a down-track cross-sectional view of the antiferromagnetically coupled junction shields in FIG. 6 wherein the upper JS is modified to have increasing thickness with increasing height from the ABS so that a combined thickness of the junction shields is constant (independent of height) according to a second embodiment of the present disclosure.

Referring to FIG. 7, a second embodiment of the present disclosure is illustrated and retains all of the features of the first embodiment except a second JS layer 14-1 replaces JS layer 14 and has increasing thickness with increasing height from the ABS 30-30. The second JS layer now has a thickness t4 at a front side 14f at the ABS, and thickness t3 at the backside 14e where t4<t3, and t2>t3. Preferably, (t1+t4)=(t2+t3) such that a top surface 14t of the second JS layer is orthogonal to the ABS and parallel to lower JS layer bottom surface 13b. The effect of larger effective longitudinal bias on slowing the increase in asymmetry with ARs above 1 is maintained from the first embodiment. Moreover, for a given taper angle α, the rate of increase of LB with increasing AR or SH is greater in the FIG. 7 embodiment than in the first embodiment (FIG. 6) since the net LB is given by the difference in moment of the lower JS and the upper JS layer.

The strength of the LB on the FL is primarily determined by the net effective moment or difference in magnitudes of the moments (13m-14m) of the JS layers in the longitudinal direction. When lower JS layer 13-1 is a material with saturation magnetization $Ms_1$ and JS layer 14-1 is a material with saturation magnetization $Ms_2$, magnitude of magnetization 13m is proportional to $Ms_1 \times (t1+t2)/2$ and is purposely made higher than the magnitude of the magnetization 14m, which is proportional to $Ms_2 \times (t3+t4)/2$ to give a net longitudinal bias parallel to that of the FL magnetization (6m in FIG. 3).

In the second embodiment, in addition to the lower JS layer 13-1 becoming effectively thicker with increasing AR, the upper JS layer 14-1 is effectively thinner with increasing AR. Thus, the effective magnitude (saturation magnetization×thickness) of 14m subtracted from that of 13m increases at a faster rate with increasing AR compared with the situation in FIG. 6 where the effective magnitude (saturation magnetization×thickness) of 13m increases with AR, but that of 14m is constant with increasing AR. In other words, adjusting the lower JS layer to have thickness t1 at the ABS where t1>t2, and adjusting the thinner second JS layer to have thickness t4 at the ABS where t4<t3, ensures a larger rate of increase in LB with increasing AR than the JS structure in FIG. 6 of the first embodiment, and hence offers a larger rate of compensation of asymmetry with increasing AR or SH.

In all of the aforementioned embodiments relating to JS 12, all JS layers extend to the same height h from the ABS where h is preferably greater than or equal to the SH (not shown) of the FL to ensure a maximum LB along the entire height (SH) of each side 6s of free layer 6f.

Figure 8:
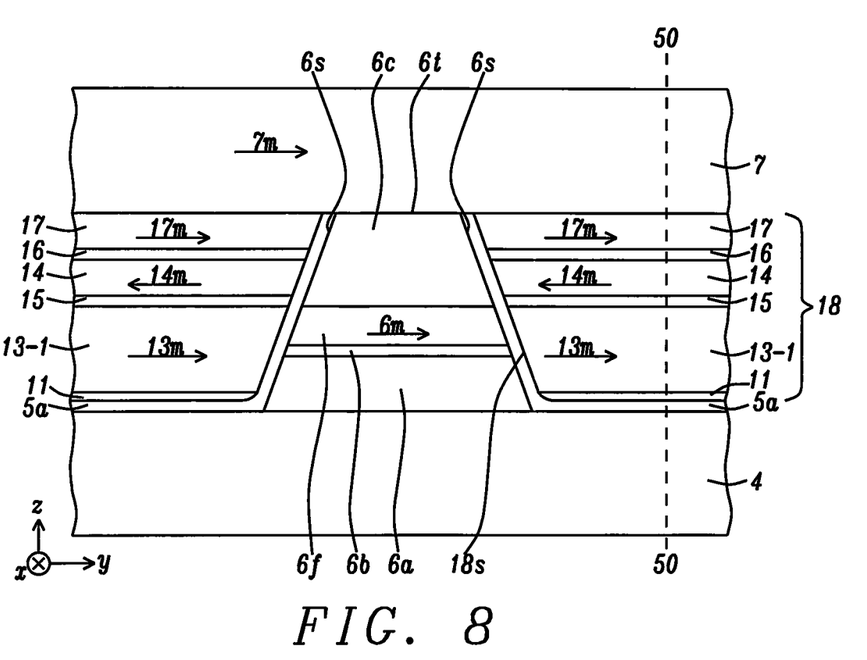
FIG. 8 is an ABS view of a sensor structure wherein FL magnetization is stabilized by three junction shields that are antiferromagnetically coupled on each side of the FL according to an embodiment of the present disclosure.

According to another embodiment illustrated in the ABS view in FIG. 8, the JS structure 12 in the previous embodiments may be replaced by JS structure 18 with sidewall 18s where a second AFC layer 16 is formed on second JS layer 14, and a third JS layer 17 is disposed on the second AFC layer. All other aspects of the sensor structure relating to layers 6a, 6b, 6f, and 6c in FIGS. 3-4 are retained. The third JS layer has a magnetization 17m that is aligned parallel to magnetization 13m in the lower JS layer 13-1, and is advantageously used to further stabilize the junction shield structure, especially when magnetization 17m is pinned by ferromagnetic coupling with magnetization 7m in the top shield. In summary, magnetization 17m is antiferromagnetically coupled to magnetization 14m that in turn is antiferromagnetically coupled to magnetization 13m to stabilize JS structure 18. Here, magnetization 13m continues to provide the primary contribution for longitudinal biasing of FL magnetization 6m, and is designed to have a greater (Ms× thickness) value than that of JS layers 14, 17. Down-track cross-sectional views relating to the structure in FIG. 8 are described with respect to FIGS. 9-10.

Figure 9:
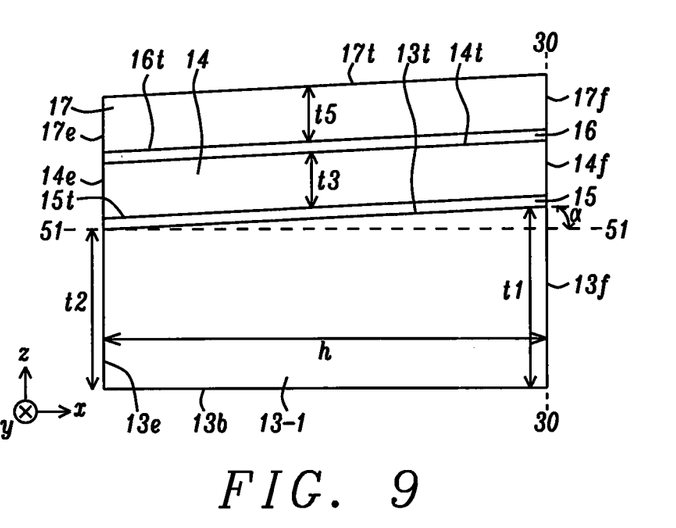
FIG. 9 is a down-track cross-sectional view of the three junctions shields in FIG. 8 wherein a lower JS is tapered to have decreasing thickness with increasing height from the ABS while middle and upper junction shields have a constant thickness according to a third embodiment of the present disclosure.

In FIG. 9, a third embodiment of the JS structure of the present disclosure is depicted from a down-track cross-sectional view at plane 50-50 in FIG. 8. In particular, the lower JS layer 13-1 and second JS layer 14 features are maintained from the first embodiment where tapered top surface 13t is formed at an angle α with respect to plane 51-51, and AFC layer 15 with a uniform thickness and top surface 15t, and second JS layer 14 with constant thickness t3 are sequentially formed thereon. In addition, the second AFC layer 16 with top surface 16t preferably has a uniform thickness on a top surface 14t of the second JS layer. Moreover, the third JS layer 17 with a front side 17f at the ABS 30-30, and a backside 17e at height h has a constant thickness t5 with increasing height from the ABS. Preferably, both t3 and t5 are less than t2. Accordingly, top surface 17t is tapered and is essentially parallel to top surfaces 13t and 14t of JS layers 13-1, 14, respectively. In the exemplary embodiment, all layers in JS structure 18 extend to the same height h from the ABS where h is preferably greater than or equal to the FL SH (not shown) to ensure a maximum LB along the entire height (SH) of each side 6s of FL 6f.

Figure 10:
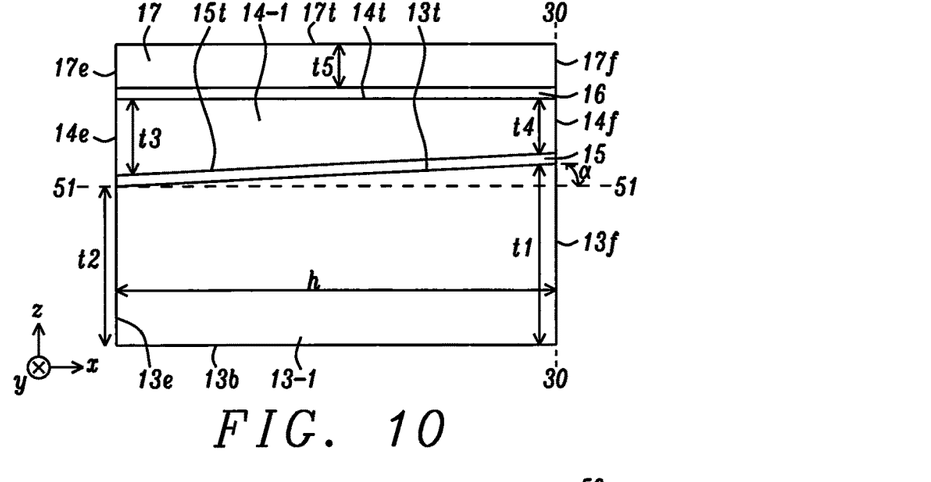
FIG. 10 is a down-track cross-sectional view of the antiferromagnetically coupled junction shields in FIG. 9 wherein the middle JS is modified to have increasing thickness with increasing height from the ABS so that a combined thickness of the three junction shields is constant (independent of height) according to a fourth embodiment of the present disclosure.

Referring to FIG. 10, a fourth embodiment of the JS structure of the present disclosure is depicted from a down-track cross-sectional view. Here, the lower JS layer 13-1 and second JS layer 14-1 features are maintained from the second embodiment where tapered top surface 13t is formed at an angle α with respect to plane 51-51. As described previously, AFC layer 15 with top surface 15t has a uniform thickness, and second JS layer 14-1 has a thickness t4 at the ABS that is less than thickness t3 at a backside 14e thereof. The JS structure in the second embodiment is modified with the addition of a second AFC layer 16 having a uniform thickness on a top surface 14t of the second JS layer, and forming the third JS layer 17 with a front side 17f at the ABS 30-30, and a backside 17e with a constant thickness t5 on the second AFC layer. As a result, a combined thickness (t1+t4+t5) of the JS layers at the ABS is preferably equal to the combined thickness (t2+t3+t5) of the JS layers at the JS backside, and top surface 17t is essentially parallel to lower JS layer bottom surface 13b. The benefit of slowing an increase in asymmetry with increasing AR above 1 is also realized in aforementioned third and fourth embodiments.

Figure 11:
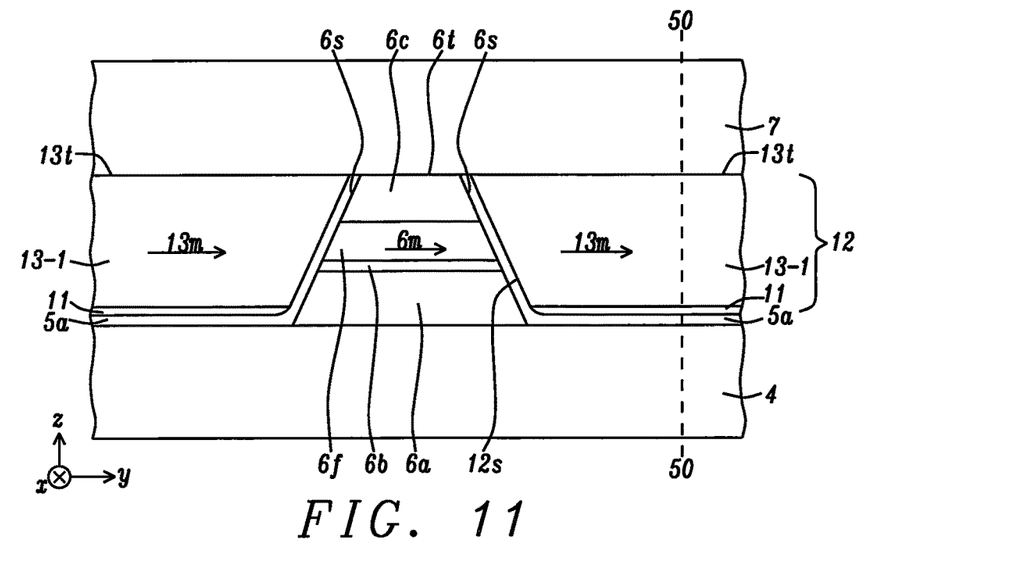
FIG. 11 is an ABS view of a sensor structure wherein FL magnetization is longitudinally stabilized by a single tapered JS formed on each side of the FL according to an embodiment of the present disclosure.

The present disclosure also encompasses an embodiment depicted in FIG. 11 where JS 12 on each side of the sensor structure has a single JS layer 13-1 with magnetization 13m aligned parallel to magnetization 6m in FL 6f. Otherwise, all aspects of the read head structure in earlier embodiments are retained.

Figure 12:
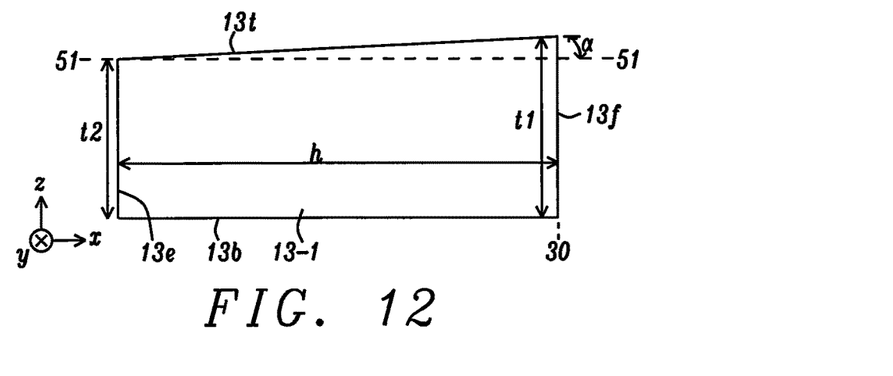
FIG. 12 is a down-track cross-sectional view of the single tapered JS shown in FIG. 11.

As indicated by the down-track cross-sectional view in FIG. 12, top surface 13t of JS layer 13-1 is tapered and has a thickness t1 at a front side 13f at the ABS 30-30 that is greater than thickness t2 at backside 13e as described previously with regard to the first four embodiments. Although the single JS layer embodiment may be less stable than the JS structure in earlier embodiments where at least two JS layer are antiferromagnetically coupled, the tapered JS layer is expected to provide an advantage in limiting the rate of increase in reader asymmetry as AR (SH/FLW) increases above 1.

To confirm the advantage of incorporating a JS structure having a tapered top surface on a lower JS layer according to the first embodiment depicted in FIG. 6, full micromagnetic simulations were performed and compared with results from a POR design in FIG. 5 where thicknesses for both the lower JS layer and second JS layer are constant with increasing height from the ABS. The geometry of both of the FIG. 6 design and POR design has been defined and meshed, and the mesh in both cases was exported using commercial finite element modeling software. The Landau-Lifshitz-Gilbert equation (1) below that predicts the precessional motion of magnetization $\vec{M}$ in a solid including the rotation of magnetization in response to torques has been solved in the finite element mesh using commercial micro-magnetic simulation software.

$$\frac{d\vec{M}}{dt} = -|\bar{\gamma}|\vec{M} \times \vec{H}_{eff} - \frac{|\bar{\gamma}|\alpha}{M_s}\vec{M} \times (\vec{M} \times \vec{H}_{eff}) \quad (1)$$

In equation (1), $\vec{M}$ is the magnetization vector, $M_s$ is the saturation magnetization, $\vec{H}_{eff}$ is the effective field, $\bar{\gamma}$ is the Landau-Lifshitz gyromagnetic ratio, α is the damping constant, and t is time.

For the simulation, the top surface 13t of the lower JS layer 13-1 is assumed to have a 3° angle α with respect to plane 51-51 so that the lower JS layer is approximately 1.5 nm thicker at the ABS 30-30 than at backside 13e where t2 is 10 nm in this example (with effective height of JS being proximate to FL SH and for FL AR~1). The thickness of second JS layer 14 was set at 1.5 nm and FLW=30 nm. Inputted Ms values for various layers are the following: 1.07 Tesla (T) for JS layer 13-1; 1.77 T for JS layer 14; 1.64 T for the AP1 RL; and 0.935 T for the FL. As mentioned earlier, increasing the taper angle α above 3° will provide a larger rate of compensation of asymmetry as AR increases. Details of the geometry and material parameters of the remainder of the pinning stack and the shields in the model are not critical with respect to the main focus of the present disclosure, and are omitted for the sake of brevity and simplicity.

Figure 13:
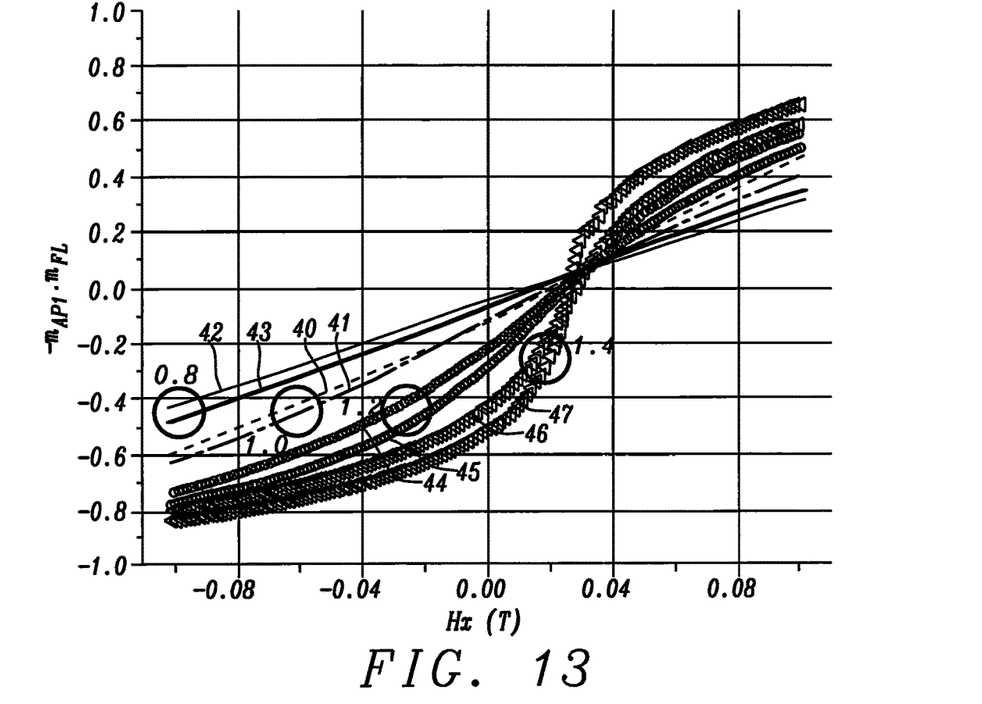
FIG. 13 is a plot of TMR reader transfer curves from micromagnetic simulations showing that a tapered JS according to the present disclosure compensates for increased asymmetry at higher AR unlike the results observed with a uniform JS in the prior art.

FIG. 13 shows the simulated transfer curves of the sensor structure in the read head for an adjacent JS structure of the first embodiment, and for the POR JS design in FIG. 5. The negative value of the scalar product of the FL and AP1 RL magnetizations shown as m ($-m_{AP1} \cdot m_{FL}$) where $m_{AP1}$ and $m_{FL}$ are magnetizations 24m and 6m, respectively, in FIGS. 3-4, is proportional to the resistance of the sensor, and is plotted as a function of the externally applied uniform field in the transverse direction ($H_X$). We observe that the bias point (determined by the dot product $m_{AP1} \cdot m_{FL}$ at zero applied field or $H_X=0$) shifts at a slower rate to the parallel state ($-m_{AP1} \cdot m_{FL}=-1$) as AR increases from 0.8 to 1.0, 1.2, and 1.4, respectively, for the tapered JS structure compared with the POR design. Note that curve 40 (tapered JS at AR=0.8), curve 42 (tapered JS at AR=1.0), curve 44 (tapered JS at AR=1.2), and curve 46 (tapered JS at AR=1.4) each have a less negative product ($-m_{AP1} \cdot m_{FL}$) than curve 41 (POR at AR=0.8), curve 43 (POR at AR=1.0), curve 45 (POR at AR=1.2), and curve 47 (POR at AR=1.4), respectively, at $H_X=0$.

Figure 14:
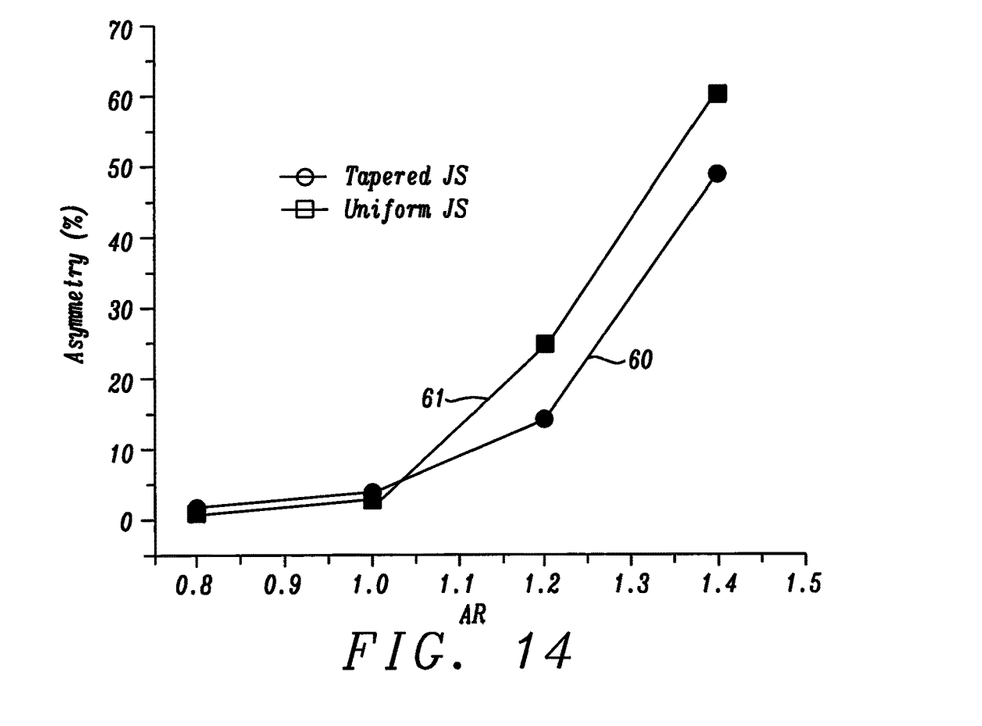
FIG. 14 shows a plot of asymmetry vs. AR from micromagnetic simulations for a tapered JS, and a uniform JS in a TMR reader.

In FIG. 14, asymmetry of the QST response (relative difference between reader resistance at $H_X=600$ Oe and $H_X=-600$ Oe) is plotted as a function of AR for the POR JS design in FIG. 5 (curve 61), and the tapered JS of the first embodiment in FIG. 6 (curve 60). Clearly, the tapered JS design where angle α=3° has a smaller rate of increase in asymmetry for ARs greater than 1 compared with the conventional JS structure.

Figure 15:
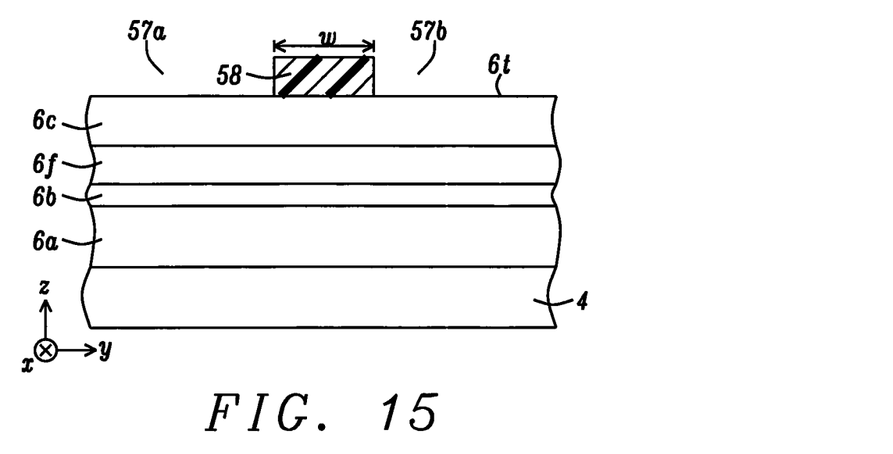
FIGS. 15-20 depict a series of process steps for fabricating a tapered JS adjacent to a sensor structure according to a process of the present disclosure.

The present disclosure also encompasses a method of forming a sensor with adjacent JS structures comprised of a tapered lower JS layer. In FIG. 15, a first step in a fabrication process is depicted wherein a bottom shield 4 is formed on a substrate (not shown) by a plating method, for example. Thereafter, layers 6a, 6b, 6f, and 6c in the sensor stack are sequentially formed on a top surface of the bottom shield by a sputter deposition process. According to one embodiment that represents a bottom spin valve configuration illustrated in FIG. 4, layer 6a is comprised of a lower seed layer, a middle AFM layer, and an uppermost SyAP RL with an AP2/AFC layer/AP1 configuration on the AFM layer. Note that in some designs, one or both of the AFM layer and the SyAP RL may be recessed from the ABS entirely or in part, requiring additional process steps to be defined.

During the following step in the fabrication sequence, a photoresist layer is spin coated and patterned on the sensor top surface 6t by a photolithography process to generate a pattern including a photoresist island 58 having a width w in the cross-track direction. The photoresist pattern typically includes a plurality of islands arranged in rows and columns from a top-down view that is not shown in order to focus on the key features in the drawing. There are openings 57a, 57b on either side of the photoresist island that expose substantial portions of top surface 6t. A large portion of top surface 6t is also uncovered along a backside (not shown) of island 58 to completely isolate adjacent islands in the photoresist pattern.

Figure 16:
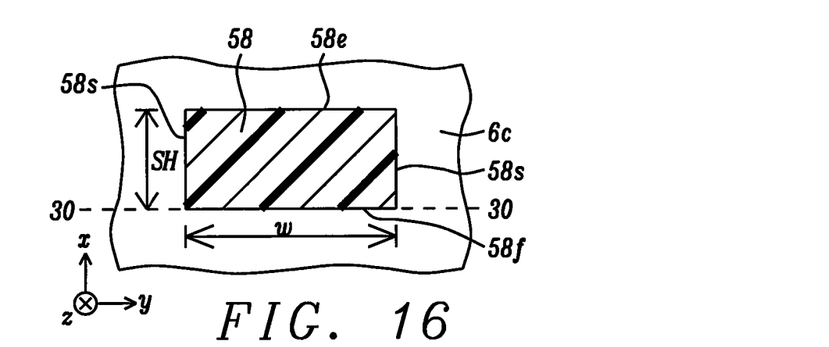

According to one embodiment in FIG. 16, each island 58 may have a substantially rectangular shape from a top-down view with a stripe height SH along sidewalls 58s. A front side 58f of each island is formed along plane 30-30 that indicates the eventual position of the ABS after a lapping process is performed as appreciated by those skilled in the art. In an alternative fabrication flow, two separate photolithography steps may be employed to pattern the cross-track dimension w, and the SH dimension. Moreover, the patterned photoresist island 58 may extend to an opposite side of plane 30-30 with respect to backside 58e since the SH dimension may be further defined by the subsequently formed FL during the aforementioned lapping process. In some embodiments where sidewalls 6s in FIG. 3 (or FIG. 8) are proximate to 90° with respect to the top surface of bottom shield 4, cross-track width w between sides 58s is substantially equal to the desired FLW in free layer 6f following a subsequent etch process.

Figure 17:
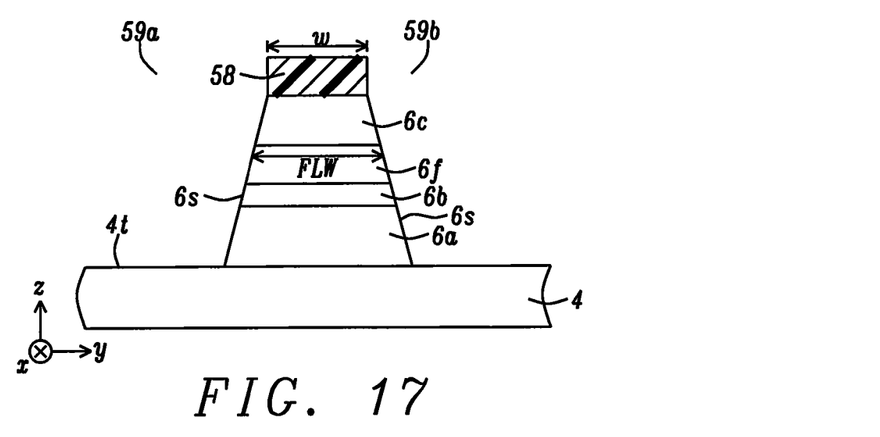

Referring to FIG. 17, a reactive ion etch (RIE) or ion beam etch (IBE) process is performed to transfer the shape of the photoresist island 58 bounded by openings 59a, 59b through the sensor stack of layers. The etch process stops on a top surface 4t of the bottom shield. As mentioned previously, the exemplary embodiment shows non-vertical sidewalls 6s. However, depending on the etch process and the desired FLW, substantially vertical sidewalls 6s may be formed in other embodiments such that w is not significantly less than FLW. Also, as mentioned earlier, depending on the exact design of the reader, a portion of stack 6a including the RL may be recessed from the ABS (plane 30-30 in FIG. 16).

Figure 18:
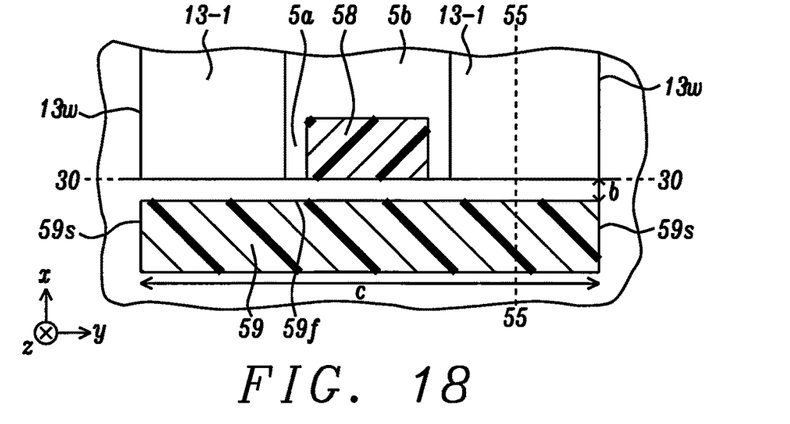

Referring to FIG. 18, insulation layer 5a is deposited along the sidewalls 6s and on exposed portions of top surface 4t, including a portion 5b behind the patterned TMR sensor stack. In alternative process flows, the portion of the insulation layer 5b at a backside of the FL (not shown) below photoresist island 58, and portions of the insulation layer 5a along the sides of the FL may be formed using separate photolithography and deposition processes. Next, seed layer 11 and lower JS layer 13-1 having sidewalls 13w are sequentially deposited on the insulation layer with an ion beam deposition (IBD) method or the like. A second photoresist layer is coated, patternwise exposed, and developed to yield a rectangular shaped island 59 having a cross-track width c between sides 59s. Island 59 has a front side 59f that is on an opposite side of plane 30-30 with respect to island 58, and is recessed a distance b from plane 30-30. In embodiments where photoresist island 58 extends beyond the eventual ABS plane as mentioned previously with regard to FIG. 16, some or all of photoresist island 59 may be formed on a top surface of photoresist island 58.

Figure 19:
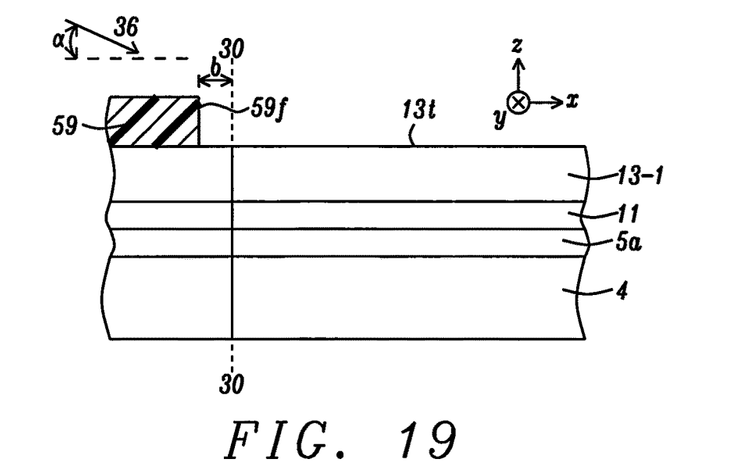

Referring to FIG. 19, a down-track cross-sectional view of the layout in FIG. 18 is shown along plane 55-55 and shows an exposed top surface 13t. A key feature is an angled IBE where ions 36 are directed at top surface 13t at a taper angle α. The ions may be generated from a noble gas that is Ar, Kr, Ne, or Xe.

Figure 20:
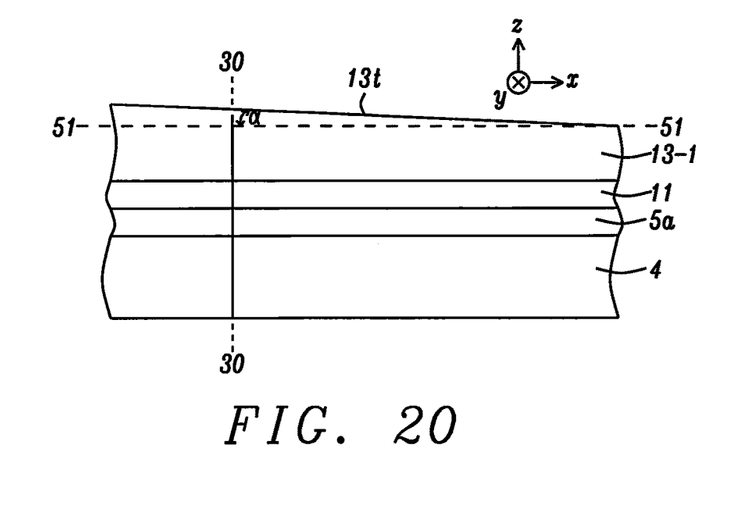

FIG. 20 shows the result of the IBE in FIG. 19, and subsequent removal of photoresist islands 58, 59 by a conventional stripping process. Thereafter, AFC layer 15, and JS layer 14 are conformally deposited on top surface 13t to provide the JS structure depicted in the first embodiment shown in FIG. 6.

With regard to the second embodiment depicted in FIG. 7, the AFC layer 15 is deposited on the tapered top surface 13t of lower JS layer 13-1. Then, upper JS layer 14-1 is deposited on the AFC layer. A chemical mechanical polish (CMP) step or an alternative planarization method may be performed to yield an upper JS layer top surface 14t that is coplanar with top surface 6t of the TMR sensor.

Thereafter, a top shield is formed with a conventional process to complete the shield structure depicted in FIG. 3. As mentioned previously, a second anneal step may be performed to set the direction of JS layer 13-1. However, the anneal conditions should not be too strenuous in order to avoid altering the magnetization direction 6m in free layer 6f in the sensor structure. After all layers in the read head or combined read/write head are formed, a conventional lapping process is employed to form the ABS at plane 30-30.

In summary, all of the embodiments described herein may be accomplished with materials and processes used in the art. Therefore, enhanced TMR sensor performance for ARs above 1 is realized by compensating the longitudinal bias to slow the increase in asymmetry compared with prior art JS schemes. The benefits of the present disclosure are achieved with no considerable additional cost compared with current fabrication schemes that produce JS structures wherein each magnetic layer has a uniform thickness.

While this disclosure has been particularly shown and described with reference to, the preferred embodiment thereof, it will be understood by those skilled in the art that various changes in form and details may be made without departing from the spirit and scope of this disclosure.

We claim:

1. A method of forming a junction shield structure in a read head, comprising:
    (a) providing a sensor structure on a bottom electrode, and with two sidewalls formed orthogonal to a first plane and terminating at a backside, and comprised of a free layer (FL) having a FL width (FLW) and a magnetization in a cross-track direction between the two sidewalls, wherein there is a stripe height (SH) between a FL front side at the first plane and a FL backside;
    (b) forming an insulation layer on the two sidewalls and sensor structure backside, and on exposed portions of a top surface of the bottom electrode;
    (c) depositing a first junction shield (JS) layer above the insulation layer and adjacent to each of the two sidewalls, the first JS layer has a bottom surface aligned orthogonal to the first plane and extends from the first plane to a backside at a first height that is greater than or equal to the stripe height and wherein the first JS layer has a first magnetization (JS1) that is parallel to the FL magnetization thereby providing a longitudinal bias to the FL;
    (d) forming a tapered top surface having a taper angle greater than 0 degrees on the first JS layer such that a first down-track thickness (t1) at the first plane is greater than a second down-track thickness (t2) at the first JS layer backside, and a thickness of the first JS layer decreases with increasing height from the first plane; and
    (e) performing a lapping process to form an air bearing surface (ABS) at the first plane.

2. The method of claim 1 further comprised of forming a seed layer on the insulation layer before the first JS layer is deposited.

3. The method of claim 1 further comprising:
    (a) depositing a first antiferromagnetic coupling (AFC) layer having a substantially uniform thickness on the tapered top surface of the first JS layer; and
    (b) depositing a second JS layer on the first AFC layer before performing the lapping process, wherein the second JS layer has a constant thickness (t3) between a front side at the ABS and a backside thereof where t3<t2, and wherein a second magnetization (JS2) is aligned anti-parallel to JS1 to provide a net longitudinal bias on the FL determined by a difference (JS1−JS2).

4. The method of claim 1 further comprising:
    (a) depositing a first AFC layer having a substantially uniform thickness on the first JS layer; and
    (2) forming a second JS layer on the first AFC layer before performing the lapping process, and wherein a thickness of the second JS layer increases with increasing height from the ABS such that there is a fourth thickness (t4) at the ABS that is less than a third thickness (t3) at a second JS layer backside, where (t1+t4)=(t2+t3), and wherein a second magnetization (JS2) is aligned anti-parallel to JS1 to provide a net longitudinal bias determined by a difference (JS1−JS2).

5. The method of claim 3 further comprised of depositing a second AFC layer having a substantially uniform thickness on a top surface of the second JS layer, and then depositing a third JS layer with a substantially uniform thickness on a top surface of the second AFC layer before performing the lapping process.

6. The method of claim 4 further comprised of depositing a second AFC layer having a substantially uniform thickness on a top surface of the second JS layer, and then depositing a third JS layer with a substantially uniform thickness on a top surface of the second AFC layer before performing the lapping process.

7. The method of claim 5 wherein the first JS layer, second JS layer, and third JS layer are comprised of CoFe, NiFe, CoPt, CoCrPt, or FePt.

8. The method of claim 6 wherein the first JS layer, second JS layer, and third JS layer are comprised of CoFe, NiFe, CoPt, CoCrPt, or FePt.

9. The method of claim 1 wherein the tapered top surface on the first JS layer forms a taper angle, and an effective longitudinal bias applied to the FL magnetization increases as the SH increases.

* * * * *